United States Patent [19]
Harvey

[11] Patent Number: 5,920,469
[45] Date of Patent: Jul. 6, 1999

[54] DC POWER SUPPLY OPERABLE FROM VARIABLE A.C. SUPPLY MAINS AND UTILIZING MINIMALLY SIZED ENERGY STORAGE CAPACITOR

[76] Inventor: Philip C. Harvey, 20 Drinkwater Rd, Hampton Falls, N.H. 03844-0369

[21] Appl. No.: 09/058,979

[22] Filed: Apr. 13, 1998

[51] Int. Cl.⁶ .................................................. H02H 7/122
[52] U.S. Cl. .................. 363/56; 363/49; 323/901
[58] Field of Search .................. 363/34, 39, 44, 363/124, 125, 127, 50, 55, 56, 49; 323/299, 901; 361/18, 86, 91

[56] References Cited

U.S. PATENT DOCUMENTS

| | | | |
|---|---|---|---|
| 3,697,852 | 10/1972 | Gerbitz | 363/21 |
| 3,843,919 | 10/1974 | Yamamura et al. | 363/25 |
| 4,070,701 | 1/1978 | Harnden, Jr. et al. | 363/25 |
| 4,383,292 | 5/1983 | Onodera et al. | 363/21 |
| 4,389,702 | 6/1983 | Clemente et al. | 363/21 |
| 4,485,431 | 11/1984 | Ishiguro | 363/20 |
| 4,564,897 | 1/1986 | Okamoto et al. | 363/132 |
| 4,736,286 | 4/1988 | Gulczynski | 363/70 |
| 5,331,534 | 7/1994 | Suzuki et al. | 363/34 X |
| 5,499,175 | 3/1996 | Noro | 363/16 |
| 5,546,295 | 8/1996 | Prete et al. | 363/17 |
| 5,574,632 | 11/1996 | Pansier | 363/49 |
| 5,657,211 | 8/1997 | Brockmann | 363/16 |

*Primary Examiner*—Peter S. Wong
*Assistant Examiner*—Y. J. Han
*Attorney, Agent, or Firm*—Henry D. Pahl, Jr.

[57] ABSTRACT

The DC power supply disclosed herein is adapted to be energized from AC supply mains and incorporates a DC to DC switching inverter provided with an energy storage or filter capacitor for supplying an input voltage to the inverter. The capacitor is charged from the AC supply mains through a rectifier. A semiconductor switching device is interposed between the AC supply mains and the capacitor. A sensing circuit actuates the switching device to disconnect the capacitor from the supply mains when the voltage applied to the capacitor exceeds a pre-selected level.

10 Claims, 2 Drawing Sheets

DC POWER SUPPLY OPERABLE FROM VARIABLE A.C. SUPPLY MAINS AND UTILIZING MINIMALLY SIZED ENERGY STORAGE CAPACITOR

BACKGROUND OF THE INVENTION

The present invention relates to a DC power supply and more particularly to such a power supply which is adapted to be energized from AC supply mains and to accommodate a wide range of AC supply voltage.

Increasingly, DC power supplies for computers and other electronic systems operated from AC supply mains employ a relatively high frequency DC to DC switching inverter. A filter capacitor or other energy storage device is normally provided at the input terminals of the inverter so as to provide a source of current during those portions of the AC supply cycle when the instantaneous voltage is below that necessary to operate the inverter. However, when the power supply is required to operate over a wide range of AC input voltages, the system components and particularly the energy storage element, must be sized and rated to accommodate the maximum input voltage. For example, if the system must accommodate input voltages ranging from 90 volts AC to 270 volts AC the voltage rating of the components must be essentially three times the values which would just operate the system at the minimum voltage. Further, since power and energy stored go as the square of the voltage, the required size of the components, especially the input energy storage device, will go up essentially by a factor of nine.

In accordance with the practice of the present invention, the cost of this over capacity is avoided by interposing a semi-conductor switching device between the AC supply mains and the energy storage device, e.g., the filter capacitor, and by operating the switching device in response to the applied voltage so that the storage device is disconnected from the supply mains whenever the voltage supplied to the storage element exceeds a pre-selected level.

SUMMARY OF THE PRESENT INVENTION

The present invention relates to an AC mains energized DC power supply which incorporates a DC to DC switching inverter provided with an energy storage element such as a filter capacitor for providing an input voltage to the inverter. A rectifier is provided for charging the storage element from the AC supply mains and a semi-conductor switching device is interposed between the AC supply mains and the storage element. A sensing circuit actuates the switching device to disconnect the storage element from the supply mains whenever the voltage supplied to the storage element exceeds a pre-selected level.

BRIEF DESCRIPTION OF THE DRAWINGS

Corresponding reference characters indicate corresponding parts throughout the several views of the drawings.

BRIEF DESCRIPTION OF THE PREFERRED EMBODIMENT

Figure 1:
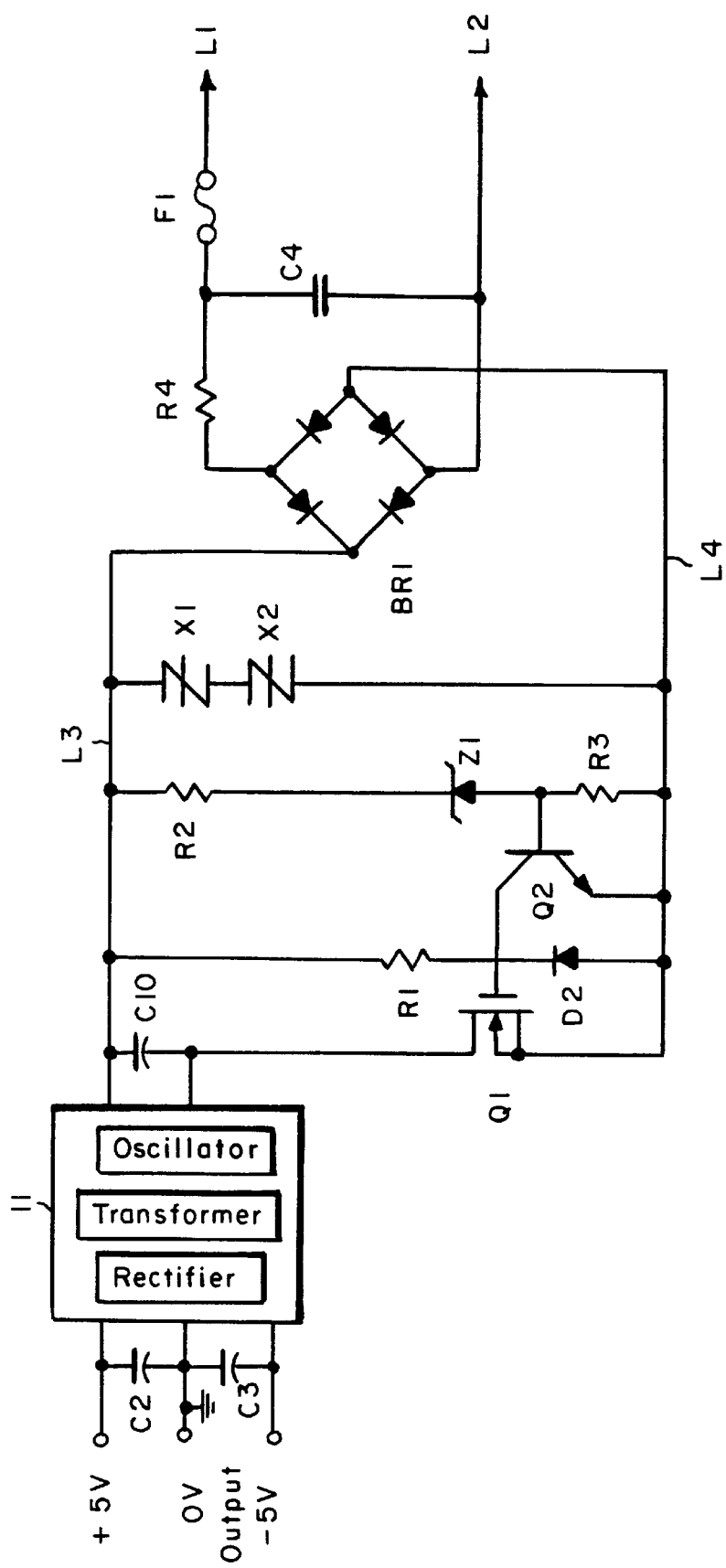
FIG. 1 is a schematic circuit diagram of a DC power supply constructed in accordance with the present invention.

Referring now to FIG. 1, reference character 11 designates a commercially available DC to DC switching inverter. In the particular embodiment, illustrated, this inverter is a model 48 D5 inverter available from the Newport Technologies, Inc. of Raleigh, N.C. This inverter is adapted to operate from a 48 volt input and to provide plus or minus five volts DC with that input voltage. As is understood by those skilled in the art, such inverters include a transistorized oscillator or commutator, a transformer which provides feedback for the oscillator and isolation between the input and output, and an output rectifier. In the particular embodiment illustrated, the inverter does not incorporate an output voltage regulator and regulation is provided at the input.

Inverter 11 is provided with an input filter capacitor C10 for energy storage. Because of the operation provided by the circuitry of the invention, this input filter capacitor can be chosen with a working rating of 63 volts even though the supply will accommodate AC input voltages from 85 to 270 volts. The input filter capacitor C10 is charged from the AC supply main leads L1 and L2 through full wave bridge rectifier BR1, and a MOSFET (metal-oxide semiconductor field-effect transistor) switch Q1. The leads out of the bridge rectifier BR1 are designated L3 and L4.

The input line L1 is provided with a fuse F1 and a current limiting resistor R1. A noise filtering capacitor C4 is provided bridging the input lines. Further protection from input line voltage spikes is provided by so called crowbar ICs X1 and X2 which bridge the leads L3 and L4.

The MOSFET switch Q1 is controlled by an NPN transistor Q2 which is turned on by a 47 volt Zener diode Z1 when the voltage being applied to the capacitor exceeds about 48 volts. The operation of this circuitry may be essentially summarized as follows. During each half cycle of the AC supply voltage, the input capacitor C10 is charged from the supply mains so long as the voltage applied thereto does not exceed 48 volts. When the voltage between the DC supply leads L3 and L4 exceeds 48 volts, the NPN transistor Q2 is turned on which, in turn, turns off the MOSFET switch Q1 thereby effectively disconnecting the energy storage element (filter capacitor C10), from the AC supply mains.

Since the filter capacitor C10 is protected from being charged to a voltage above the pre-selected threshold, it's voltage rating can be held to a level commensurate with the minimum design input voltage for the switching inverter 11. Further, since the switching inverter itself is likewise protected from higher input voltages, the internal components of that system can be likewise sized for the optimum design input level without consideration for a possible wide range of AC input voltages.

As will be understood by those skilled in the art, many different particular component types and values may be utilized in practicing the invention. However, for purposes of illustration, the following component values and types were utilized in one particular embodiment of the invention.

BR1=600V Rectifier Bridge
C1=100 $\mu$F/63V filter cap
C2=100 $\mu$F/6.3V filter cap
C3=100 $\mu$F/6.3V filter cap
C4=1 nF/500V EMI cap
D1=47V Zener Diode
D2=10V Zener Diode
11=48:±5V DC-DC converter (Newport Technology, Raleigh, N.C.)
F1=Raychem TR250 "Polyswitch" PTC auto reset fuse (Polytron Devices, Menlo Park, Calif.)
R1=100 k
R2=100 k R3=33 k
R4=10 Ω
Q1=1RFU420 450V N-channel MOSFET transistor (International Rectifier, LeSegundo, Calif.)
Q2=NPN transistor 2N3904
X1=P1300EA70 (120/145) SIDAC Crowbar Switch (Teccor)
X2=P3100EA70 (275/350) SIDAC Crowbar Switch (Teccor)

While the embodiment illustrated in FIG. 1 utilizes a MOSFET switch between the bridge rectifier BR1 and the filter capacitor C10, it should be understood that an AC control device such as a triac could be positioned on the input side of the bridge and operated in similar manner to as effectively disconnect the energy storage device from the supply mains when the voltage supplied thereto exceeds the pre-selected threshold, turnoff occurring at the end of A.C. half cycles.

Figure 2:
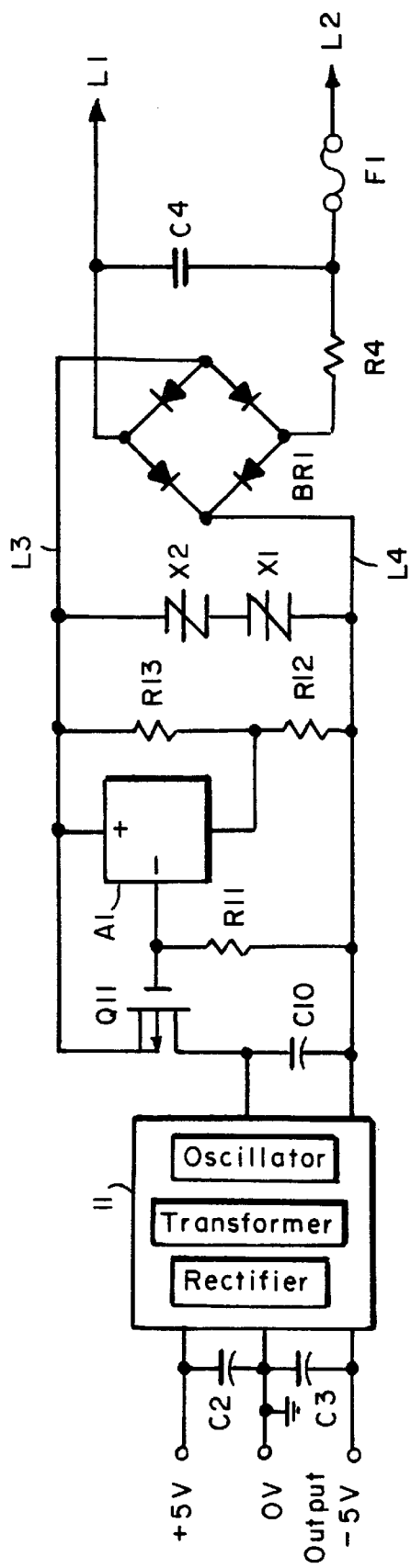
FIG. 2 is a schematic diagram of an alternative embodiment of a D.C. power supply in accordance with the present invention.

In the alternative embodiment illustrated in FIG. 2, an active voltage reference device A1 is used instead of a Zener diode. Further, the switching transistor Q11 is placed on the positive side of the energy storage capacitor C1 to accommodate the device A1 which is similar to a PNP transistor. The resistors R12 and R13 provide a variable voltage which is proportional to the voltage between leads L3 and L4. This variable voltage is compared with an internal reference in the device A1 to control the input to the switching transistor Q11. The operation is essentially similar to that of the system of FIG. 1 with the reference device A1 switching the transistor Q11 to an off state when the voltage between the supply leads exceeds about 48 volts.

Representative component values and types for the embodiment of FIG. 2 are as follows:

A1=LM385BYZ—1.24V Voltage Reference (National Semiconductor, Santa Clara, Calif.)
BR1=600V Rectifier Bridge
C1=100 μF/63V filter cap
C2=100 μF/6.3V filter cap
C3=100 μF/6.3V filter cap
C4=1 nF/500V EMI cap
I1=48:±5V DC-DC converter
F1=Raychem TR250 "Polyswitch" PTC auto reset fuse
R11=330 k
R12=464 k 1%
R13=12,4 k 1%
R4=10Ω
Q1=MTP2P50—500V P-channel MOSFET transistor (Motorola, Phoenix, Ariz.)
X1=P1300EA70 (120/145) SIDAC Crowbar Switch (Teccor)
X2=P3100EA70 (275/350) SIDAC Crowbar Switch (Teccor)

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An AC mains energized DC power supply comprising:
   a switching inverter;
   an energy storage element for providing input energy to said inverter;
   rectifier means for charging said element from AC supply mains;
   a semi-conductor switching device interposed between said AC supply mains and said element; and
   sensing circuit means for actuating said switching device to disconnect said element from said supply mains within an AC half cycle when the voltage applied to said element exceeds a pre-selected level.

2. A power supply as set forth in claim 1 wherein said inverter incorporates a transformer providing isolation from said AC mains.

3. A power supply as set forth in claim 2 wherein said energy storage element is a capacitor.

4. An AC mains energized DC power supply comprising:
   a DC to DC switching inverter;
   an energy storage capacitor for providing an input voltage to said inverter;
   rectifier means for charging said capacitor from AC supply mains;
   a semi-conductor switching device interposed between said AC supply mains and said capacitor; and
   sensing circuit means for actuating said switching device to disconnect said capacitor from said supply mains within an AC half cycle when the voltage applied to said capacitor exceeds a pre-selected level.

5. A power supply as set forth in claim 4 wherein said switching device is a field effect transistor.

6. A power supply as set forth in claim 5 wherein said rectifier means is a full wave bridge.

7. A power supply as set forth in claim 6 wherein said sensing circuit includes a Zener diode and a bipolar transistor which is turned on by said Zener diode, turning on of said bipolar transistor being operative to turn off said field effect transistor.

8. An AC mains energized DC power supply comprising:
   a DC to DC switching inverter including a transformer providing isolation between input and output;
   an energy storage capacitor for providing an input voltage to said inverter;
   full wave bridge rectifier means for charging said capacitor from AC supply mains;
   a MOSFET switching device interposed between said bridge and said capacitor; and
   sensing circuit means for actuating said switching device to disconnect said capacitor from said supply mains within an AC half cycle when the voltage applied to said capacitor exceeds a pre-selected level.

9. A power supply as set forth in claim 8 wherein said sensing circuit includes a Zener diode and a bipolar transistor which is turned on by said Zener diode, turning on of said bipolar transistor being operative to turn off said field effect transistor.

10. An AC mains energized DC power supply comprising:
    an energy storage capacitor for providing a DC voltage;
    full wave bridge rectifier means for charging said capacitor from AC supply mains;
    a MOSFET switching device interposed between said bridge and said capacitor; and
    sensing circuit means for actuating said switching device to disconnect said capacitor from said supply mains when the voltage applied to said capacitor exceeds a pre-selected level.

* * * * *